United States Patent
Lee et al.

(10) Patent No.: US 10,904,739 B2
(45) Date of Patent: Jan. 26, 2021

(54) NETWORK DATA COLLECTION METHOD FROM NETWORK FUNCTION DEVICE FOR NETWORK DATA ANALYTIC FUNCTION

(71) Applicant: ELECTRONICS AND TELECOMMUNICATIONS RESEARCH INSTITUTE, Daejeon (KR)

(72) Inventors: Soohwan Lee, Daejeon (KR); Myung Ki Shin, Seoul (KR); Seung-Ik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/705,550

(22) Filed: Dec. 6, 2019

(65) Prior Publication Data

US 2020/0322775 A1 Oct. 8, 2020

(30) Foreign Application Priority Data

| Apr. 2, 2019 | (KR) | 10-2019-0038720 |
| May 7, 2019 | (KR) | 10-2019-0053074 |
| May 7, 2019 | (KR) | 10-2019-0053317 |
| Dec. 5, 2019 | (KR) | 10-2019-0160938 |

(51) Int. Cl.
*H04W 24/08* (2009.01)
*H04W 8/02* (2009.01)
*H04W 8/18* (2009.01)
*H04W 76/30* (2018.01)
*H04W 80/02* (2009.01)

(52) U.S. Cl.
CPC ............... *H04W 8/02* (2013.01); *H04W 8/18* (2013.01); *H04W 24/08* (2013.01); *H04W 76/30* (2018.02); *H04W 80/02* (2013.01)

(58) Field of Classification Search
CPC combination set(s) only.
See application file for complete search history.

(56) References Cited

U.S. PATENT DOCUMENTS

| 8,181,195 | B2 | 5/2012 | Sardera | |
| 2017/0034023 | A1* | 2/2017 | Nickolov | H04L 43/0817 |
| 2017/0289791 | A1 | 10/2017 | Yoo et al. | |
| 2018/0014222 | A1 | 1/2018 | Song et al. | |
| 2018/0054765 | A1 | 2/2018 | Kim et al. | |
| 2018/0242198 | A1 | 8/2018 | Choi | |
| 2018/0262924 | A1* | 9/2018 | Dao | H04W 24/08 |
| 2019/0191330 | A1* | 6/2019 | Dao | H04W 28/06 |
| 2019/0253917 | A1* | 8/2019 | Dao | H04W 4/24 |
| 2019/0357301 | A1* | 11/2019 | Li | H04W 40/20 |
| 2019/0394655 | A1* | 12/2019 | Rahman | H04W 28/16 |

(Continued)

FOREIGN PATENT DOCUMENTS

WO 2017131332 A1 8/2017

*Primary Examiner* — Nathan S Taylor
(74) *Attorney, Agent, or Firm* — Rabin & Berdo, P.C.

(57) ABSTRACT

A network data collection method from network function device for network data analytic function is disclosed. The network data collection method includes transmitting a Nnf_EventExposure_Subscribe message to subscribe for an event into the NF device; and receiving a Nnf_EventExposure_Notify message from the NF device, wherein, when a subscription for the event is already defined in the NF device, the subscription is updated or modified.

16 Claims, 4 Drawing Sheets

(56) References Cited

U.S. PATENT DOCUMENTS

| | | | |
|---|---|---|---|
| 2020/0044943 A1* | 2/2020 | Bor-Yaliniz | H04L 41/5067 |
| 2020/0045753 A1* | 2/2020 | Dao | H04W 4/06 |
| 2020/0092423 A1* | 3/2020 | Qiao | H04W 76/25 |
| 2020/0092424 A1* | 3/2020 | Qiao | H04W 8/22 |
| 2020/0112868 A1* | 4/2020 | Shariat | H04W 24/02 |
| 2020/0112907 A1* | 4/2020 | Dao | H04W 48/06 |

* cited by examiner

NETWORK DATA COLLECTION METHOD FROM NETWORK FUNCTION DEVICE FOR NETWORK DATA ANALYTIC FUNCTION

CROSS-REFERENCE TO RELATED APPLICATION(S)

This application claims the benefit of Korean Patent Application No. 10-2019-0038720, filed on Apr. 2, 2019, No. 10-2019-0053074, filed on May 7, 2019, No. 10-2019-0053317, filed on May 7, 2019, and No. 10-2019-0160938 filed on Dec. 5, 2019, in the Korean Intellectual Property Office, the disclosure of which is incorporated herein by reference.

BACKGROUND

1. Field of the Invention

One or more example embodiments relate to a network data collection method from network function device for network data analytic function.

2. Description of the Related Art

Various data is generated in the network. In order to analyze various situations of such a network, it is necessary to collect network data. Various settings are necessary for the collection of such network data.

In particular, since parameters set when collecting network data are determined at the time of collecting network data, they may not be changed once determined. Thus, a method for setting parameters when collecting network data is required.

SUMMARY

According to an aspect, there is provided a network data collecting method from a network function (NF) device performed by a network data analytic function (NWDAF) device. The method includes transmitting a Nnf_EventExposure_Subscribe message to subscribe for an event into the NF device; and receiving a Nnf_EventExposure_Notify message from the NF device.

When a subscription for the event is already defined in the NF device, the subscription is updated or modified.

The event ID may identify a type of the event being subscribed to PDU session release or UE mobility out of an area of interest.

The receiving the Nnf_EventExposure_Notify message comprising receiving the Nnf_EventExposure_Notify message with an event report from the NF device, when the NWDAF device subscribes to an event ID.

The Nnf_EventExposure_Subscribe message is a Nnef_EventExposure_Subscribe message, when the NF device is a network exposure function (NEF) device. The subscription is updated, when the subscription is already defined in the NEF device.

The Nnf_EventExposure_Subscribe message is a Namf_EventExposure_Subscribe message, when the NF device is an Access and Mobility Management Function (AMF) device, The AMF device modifies an event reporting for one UE, a group of UE or any UE.

The Nnf_EventExposure_Subscribe message is a Nudm_EventExposure_Subscribe message, when the NF device is a Unified Data Management (UDM) device. The subscription is updated, when the subscription is already defined in the UDM device.

The Nnf_EventExposure_Subscribe message is a Npcf_EventExposure_Subscribe message, when the NF device is a Policy Control Function (PCF) device. The PCF device modifies an event reporting for one UE, a group of UE or any UE.

The Nnf_EventExposure_Subscribe message is a Nsmf_EventExposure_Subscribe message, when the NF device is a Session Management Function (SMF) device. The subscription is updated, when the subscription is already defined in the SMF device.

The Naf_EventExposure_Subscribe message is a Nsmf_EventExposure_Subscribe message, when the NF device is an Application Function (AF) device. The subscription is updated, when the subscription is already defined in the AF device.

According to an aspect, there is provided a network data analytic function (NWDAF) device, the NWDAF device comprising: a processor configured to transmit a Nnf_EventExposure_Subscribe message to subscribe for an event into the NF device; and receive a Nnf_EventExposure_Notify message from the NF device, wherein, when a subscription for the event is already defined in the NF device, the subscription is updated or modified.

When a subscription for the event is already defined in the NF device, the subscription is updated or modified.

The event ID may identify a type of the event being subscribed to PDU session release or UE mobility out of an area of interest.

The receiving the Nnf_EventExposure_Notify message comprising receiving the Nnf_EventExposure_Notify message with an event report from the NF device, when the NWDAF device subscribes to an event ID.

The Nnf_EventExposure_Subscribe message is a Nnef_EventExposure_Subscribe message, when the NF device is a network exposure function (NEF) device. The subscription is updated, when the subscription is already defined in the NEF device.

The Nnf_EventExposure_Subscribe message is a Namf_EventExposure_Subscribe message, when the NF device is an Access and Mobility Management Function (AMF) device, The AMF device modifies an event reporting for one UE, a group of UE or any UE.

The Nnf_EventExposure_Subscribe message is a Nudm_EventExposure_Subscribe message, when the NF device is a Unified Data Management (UDM) device. The subscription is updated, when the subscription is already defined in the UDM device.

The Nnf_EventExposure_Subscribe message is a Npcf_EventExposure_Subscribe message, when the NF device is a Policy Control Function (PCF) device. The PCF device modifies an event reporting for one UE, a group of UE or any UE.

The Nnf_EventExposure_Subscribe message is a Nsmf_EventExposure_Subscribe message, when the NF device is a Session Management Function (SMF) device. The subscription is updated, when the subscription is already defined in the SMF device.

The Naf_EventExposure_Subscribe message is a Nsmf_EventExposure_Subscribe message, when the NF device is an Application Function (AF) device. The subscription is updated, when the subscription is already defined in the AF device.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described in detail with reference to the accompanying drawings. The full name of a word used in the present invention is as follows. And, the term AMF, AF, NEF, NRF, PCF, UDM, NWDAF, CHF, NF, and SMF may be represented as device.

5GC: 5G Core Network
AF: Application Function
AMF: Access and Mobility Management Function
AUSF: Authentication Server Function
CIF: Charging Function
FQDN: Fully Qualified Domain Name
GPSI: Generic Public Subscription Identifier
NEF: Network Exposure Function
NF: Network Function
NRF: Network Repository Function
NWDAF: Network Data Analytics Function
PCF: Policy Control Function
PDU: Protocol Data Unit
SMF: Session Management Function
S-NSSAI: Single Network Slice Selection Assistance Information
SUPI: Subscription Permanent Identifier
UDM: Unified Data Management
UDR: Unified Data Repository The NWDAF is part of the architecture and uses the mechanisms and interfaces specified for 5GC and OAM.

The NWDAF interacts with different entities for different purposes.

Data collection based on event subscription, provided by AMF, SMF, PCF, UDM, AF (directly or via NEF), and OAM;

Retrieval of information from data repositories (e.g. UDR via UDM for subscriber-related information);

Retrieval of information about NFs (e.g. NRF for NF-related information, and NSSF for slice-related information);

On demand provision of analytics to consumers.

A single instance or multiple instances of NWDAF may be deployed in a PLMN. In case multiple NWDAF instances are deployed, the architecture supports deploying the NWDAF as a central NF, as a collection of distributed NFs, or as a combination of both.

When multiple NWDAFs exist, not all of them need to be able to provide the same type of analytics results, i.e., some of them may be specialized in providing certain types of analytics. An Analytics ID information element is used to identify the type of supported analytics that NWDAF may generate.

NWDAF instance(s) may be collocated with a 5GS NF.

Figure 1:
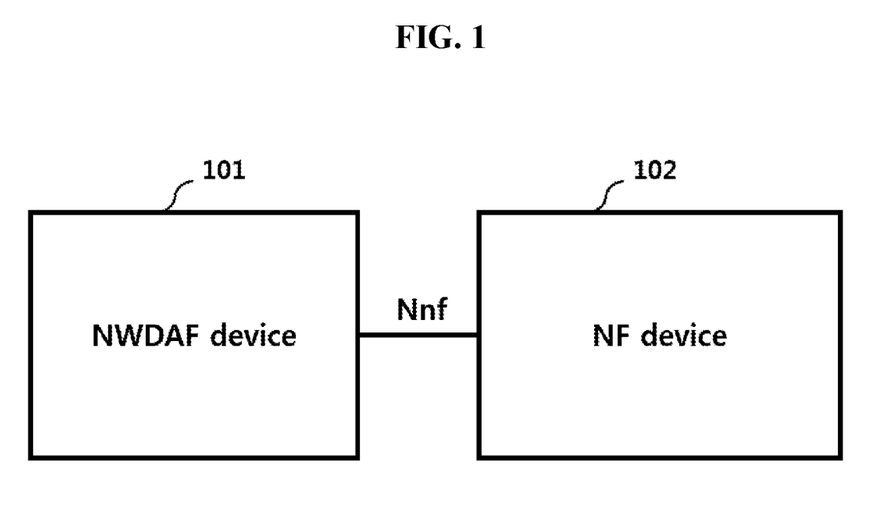
FIG. 1 is a diagram illustrating a relationship between NWDAF device and the NF device according to an example embodiment.

FIG. 1 is a diagram illustrating a relationship between NWDAF device and the NF device according to an example embodiment;

<Non-Roaming Architecture>

The 5G System architecture allows NWDAF to collect data from any NF. The NWDAF belongs to the same PLMN where the network function that notifies the data is located. The Nnf interface is defined for the NWDAF to request subscription to data delivery for a particular context, to maycel subscription to data delivery and to request a specific report of data for a particular context. The 5G System architecture allows NWDAF to retrieve the management data from OAM by invoking the existing OAM services.

<Network Data Analytics Functional Description>

The NWDAF (Network Data Analytics Function) provides analytics to 5GC NFs, and OAM. Analytics information are either statistical information of the past events, or predictive information. Different NWDAF instances may be present in the 5GC, with possible specializations per categories of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of Analytics ID(s) that it supports when registering to the NRF, in addition to other NRF registration elements of the NF profile. Other NFs requiring the discovery of an NWDAF instance that provides support for some specific type of analytics may query the NRF and include the Analytics ID(s) that identifies the desired type of analytics for that purpose.

The consumers i.e. 5GC NFs and OAM decide how to use the data analytics provided by NWDAF.

The interactions between 5GC NF(s) and the NWDAF take place within a PLMN.

The NWDAF has no knowledge about NF application logic. The NWDAF may use subscription data but only for statistical purpose.

<NWDAF Discovery and Selection>

The NWDAF service consumer selects an NWDAF that supports requested analytics information by using the NWDAF discovery principles.

<Network Data Analytics Function (NWDAF)>

NWDAF represents operator managed network analytics logical function. The NWDAF includes the following functionality:

Support data collection from NFs and AFs;
Support data collection from OAM;
NWDAF service registration and metadata exposure to NFs/AFs;
Support analytics information provisioning to NFs, AF.

<NWDAF Discovery and Selection>

Multiple instances of NWDAF may be deployed in a network. The service consumer NFs may utilize the NRF to discovery NWDAF instance(s) unless NWDAF information is available by other means, e.g. locally configured on service consumer NFs. The NWDAF selection function in service consumer NFs selects an NWDAF instance based on the available NWDAF instances. The following factors may be considered by the service consumer NF for NWDAF selection:

S-NSSAI.
Analytics ID(s).
NWDAF Serving Area information, i.e. list of TAIs related to analytics generated by a NWDAF.

<NEF Device>

Exposure of analytics:

NWDAF analytics may be securely exposed by NEF for external party.

Retrieval of data from external party by NWDAF:

Data provided by the external party may be collected by NWDAF via NEF for analytics generation purpose. NEF handles and forwards requests and notifications between NWDAF and AF.

<NEF Discovery>

The service consumer NFs may utilize the NRF to discover NEF instance(s) unless NEF information is available by other means, e.g. locally configured in service consumer NFs. The NRF provides NF profile(s) of NEF instance(s) to the service consumer NFs. The NEF discovery and selection procedures are intended to be applied by service consumer NFs deployed within the operator's domain. The following factors may be considered for NEF selection:

S-NSSAI(s).
Event ID(s) supported by.
AF Instance ID, Application ID.
External Identifier, External Group Identifier, or domain name.

<Network Exposure>

The network capability exposure comprises

Exposure of network events externally as well as internally towards core network NFs;
Exposure of provisioning capability towards external functions;
Exposure of policy and charging capabilities towards external functions;
Exposure of core network internal capabilities for analytics.
Exposure of analytics to external party.
Retrieval of data from external party by NWDAF.

When subscribing to event reporting the Service consumer NF(s) provide:

One or multiple Event ID(s). An Event ID identifies the type of event being subscribed to (e.g. PDU Session release, UE mobility out of an Area of Interest, etc.).

Event Filter Information: Provides Event Parameter Types and Event Parameter Value(s) to be matched against, in order to meet the condition for notifying the subscribed Event ID e.g. the Event Parameter Type could be "Area of interest" and Event Parameter Value list could be list of TAs; The Event Filter depends on the Event ID. The Event Filter Information is provided per Event ID(s) being subscribed to: A subscription different Event ID(s) may be associated with different Event Filter Information.

Event Reporting Information: Within a subscription, all Event ID(s) are associated with a unique Event Reporting Information.

Target of Event Reporting: this may indicate a specific UE or PDU Session, a group of UE(s) or any UE (i.e. all UEs), Within a subscription all Event ID (s) are associated with the same Target of Event Reporting (possibly corresponding to multiple UE or multiple PDU Sessions).

A Notification Target Address (+ Notification Correlation ID) allowing the Event Receiving NF to correlate notifications received from the Event provider with this subscription. A subscription is associated with an unique Notification Target Address (+ Notification Correlation ID). In the case that the Service consumer NF subscribes to the NF producer on behalf of other NF, the Service consumer NF includes the Notification Target Address(+ Notification Correlation ID) of other NF for the Event ID which is to be notified to other NF directly, and the Notification Target Address(+ Notification Correlation ID) of itself for the Subscription change related event notification. Each Notification Target Address(+ Notification Correlation ID) is associated with related (set of) Event ID(s).

An Expiry time represents the time upto which the subscription is desired to be kept as active. The Service consumer NF may suggest an Expiry time and provide to the NF service producer. Based on the operator's policy, the NF service producer decides whether the subscription may be expired. If the subscription may be expired, the NF service producer determines the Expiry time and provide it in the response to the Service consumer NF. If the event subscription is about to expire based on the received Expiry time and the Service consumer NF wants to keep receiving notifications, the Service consumer NF update the subscription with the NF service producer in order to extend the Expiry time. Once the Expiry time associated with the subscription is reached, the subscription becomes invalid at the NF service producer. If the Service consumer NF wants to keep receiving notifications, it may create a new subscription with the NF service producer.

When the subscription is accepted by the Event provider NF, the Service consumer NF receives from the event provider NF an identifier (Subscription Correlation ID) allowing to further manage (modify, delete) this subscription.

The Notification Correlation ID is allocated by the Service consumer NF that subscribes to event reporting and the Subscription Correlation ID is allocated by the NF that notifies when the event is met. Both correlation identifiers may be assigned the same value, although in principle they are supposed to be different, as they are optimized for finding the subscription related context within each NE.

The Service consumer NF may use an operation dedicated to subscription modification to add or remove Event ID(s) to this subscription or to modify Event Filter Information.

Events are subscribed by the Service consumer NF(s) by providing Event Filters. The contents of the Event Reporting Information along with the presence requirement of each information element is described in below table 1.

TABLE 1

| Event Reporting Information Parameter | Description |
| --- | --- |
| Event reporting mode | Mode of reporting - e.g reporting up to a maximum number of reports, periodic reporting along with periodicity, reporting up to a maximum duration |
| Maximum number of reports | Maximum number of reports after which the event subscription ceases to exist |
| Maximum duration of reporting | Maximum duration after which the event subscription ceases to exist |
| Immediate reporting flag | The Event provider NF notifies the current status of the subscribed event, if available, immediately to the service consumer NF. |
| Sampling ratio | Percentage of sampling (1% . . . 100%) among impacted UEs. |
| Group Reporting Guard Time T | Parameter for group-based monitoring configuration to indicate the time for which the Monitoring Event Reporting(s) detected by the UEs in a group may be aggregated before sending them to the service consumer NF. | the requester may include 2) Maximum number of reports or 3) Maximum duration of reporting, or both, depending on 1) Event reporting mode. Parameter only is applicable to certain event IDs reporting metrics (e.g. Number of UEs present in a geographical area) and is used e.g. by the NWDAF for data collection. Explicit unsubscribe by the Service consumer NF is still possible.

Maximum number of reports is applicable to the subscription to one UE or a group of UE(s). When the subscription is applied to a group of UE(s), the parameter is applied to each individual member UE. The count of number of reports is per Event Type granularity.

Maximum duration of reporting is applicable to the subscription to one UE, a group of UE(s) or any UE. When the subscription is applied to a group of UE(s), this parameter applies to each group member UE. When the subscription is applied to any UE, this parameter applies to all the impacted UEs.

If for a given subscription both Maximum Number of reports and Maximum duration of reporting are included then the subscription is considered to expire as soon as one of the conditions is met.

Sampling ratio is applicable to subscription targeting a group of UEs or any UE. When a sampling ratio is provided, a random subset is selected among the target UEs according to the sampling ratio and only the events related to this subset are reported. A UE remains selected until it is not managed by the event provider NF any more. A UE newly managed by the NF may become selected.

Group Reporting Guard Time is an optional parameter for group-based monitoring configuration to indicate the time for which the Monitoring Event Reporting(s) detected by the UEs in a group may be aggregated before sending them to the Service consumer NE. The value of the Group Reporting Guard time should be set less than the Maximum duration of reporting.

For the continuous monitoring reporting, unless the Maximum duration of reporting has been reached, the Group Reporting Guard timer is restarted when it expires. If the time left until the Maximum duration of reporting is less than the Group Reporting Guard Time, then the Group Reporting Guard timer may be set to expire when the Maximum duration of reporting expires. If the Maximum duration of reporting is expired, the Group Reporting Guard Time, if running, may be considered to expire and aggregated Monitoring Event Reporting(s) is sent to destination immediately.

Corresponding notifications contain at least the Notification Correlation ID together with the Event ID and the individual target (e.g. UE or PDU Session ID) associated with the notification.

If the Service consumer NF decides to terminate the event subscription, it unsubscribes the event subscription by sending unsubscription request to the event provider NF. After receiving unsubscription request from the Service consumer NF, the event provider NF terminates the event subscription.

The external exposure of network capabilities and core network internal event and capability exposure is described. When the immediate reporting flag is set, the first corresponding event report is included in the output message, if corresponding information is available at the reception of the subscription request of the event.

The optional parameter MTC Provider Information is a reference parameter that may be provided by AF or determined by NEF based on which AF it communicates with. The MTC Provider Information identifies the MTC Service Provider and/or MTC Application. The MTC Provider Information may be used by Service Providers for, e.g. to distinguish their different customers.

<External Exposure of Network Capabilities>

The Network Exposure Function (NEF) supports external exposure of capabilities of network functions. External exposure may be categorized as Monitoring capability, Provisioning capability, Policy/Charging capability, network status reporting capability and Analytics reporting capability. The Monitoring capability is for monitoring of specific event for UE in 5GS and making such monitoring events information available for external exposure via the NEF. The Provisioning capability is for allowing external party to provision of information which may be used for the UE in 5GS. The Policy/Charging capability is for handling QoS and charging policy for the UE based on the request from external party. The Analytics capability is for allowing external party to acquire analytics information generated by 5G System. The details for the External Exposure of Analytics capabilities as well as interactions between NEF, external party and NWDAF are described.

<Data Collection from an AF>

The Network Exposure Function (NEF) supports the capability to collect data from an AF.

<Network Function Service Procedures>

Network Function Service framework procedures

Network Function Service Discovery

The network function (NF) within the core network may expose its capability as service via its service based interfaces, which may be re-used by other NFs. Unless the expected NF information is locally configured on requester NF, e.g. the expected NF is in the same PLMN, the NF service discovery is implemented via the NF discovery.

<External Exposure of Network Capability>

The Network Exposure Function (NEF) supports external exposure of capabilities of network functions. External exposure may be categorized as Monitoring capability, Provisioning capability, Policy/Charging capability and Analytics reporting capability. The Monitoring capability is for monitoring of specific event for UE in 5G System and making such monitoring events information available for external exposure via the NEF. The Provisioning capability is for allowing external party to provision of information which may be used for the UE in 5G System. The Policy/Charging capability is for handling QoS and charging policy for the UE based on the request from external party. The Analytics reporting capability is for allowing an external party to fetch or subscribe/unsubscribe to analytics information generated by 5G System.

Monitoring capability is comprised of means that allow the identification of the 5G network function suitable for configuring the specific monitoring events, detect the monitoring event, and report the monitoring event to the authorised external party. Monitoring capability may be used for exposing UE's mobility management context such as UE location, reachability, roaming status, and loss of connectivity. AMF stores URRP-AMF information in the MM context to determine the NFs that are authorised to receive direct notifications from the AMF. UDM stores URRP-AMF information locally to determine authorised monitoring requests when forwarding indirect notifications.

Provisioning capability allows an external party to provision the Expected UE Behaviour or the 5GLAN group information or service specific information to 5G NF via the NEF. The provisioning comprises of the authorisation of the provisioning external third party, receiving the provisioned external information via the NEF, storing the provisioned external information, and distributing that provisioned external information among those NFs that use provisioned external information. The externally provisioned data may be consumed by different NFs, depending on the data. In the case of provisioning the Expected UE Behaviour, the externally provisioned information which is defined as the Expected UE Behaviour parameters or Network Control parameter consists of information on expected UE movement, Expected UE Behaviour parameters or expected Network Configuration parameter.

The provisioned Expected UE Behaviour parameters may be used for the setting of mobility management or session management parameters of the UE. In the case of provisioning the 5GLAN group information, the externally provisioned information is defined as the 5GLAN group parameters, and the externally provisioned information consists of some information on the 5GLAN group. The affected NFs are informed via the subscriber data update. The externally provisioned information which is defined as the Service Parameters consists of service specific information used for supporting the specific service in 5G system. The provisioned Service Parameters may be delivered to the UEs. The affected NFs are informed of the data update.

Policy/Charging capability is comprised of means that allow the request for session and charging policy, enforce QoS policy, and apply accounting functionality. It may be used for specific QoS/priority handling for the session of the UE, and for setting applicable charging party or charging rate.

Analytics reporting capability is comprised of means that allow discovery of type of analytics that may be consumed by external party, the request for consumption of analytics information generated by NWDAF.

An NEF may support CAPIF functions for external exposure as specified.

An NEF may support exposure of NWDAF analytics as specified.

<Data Collection from an AF>

An NF that needs to collect data from an AF may subscribe/unsubscribe to notifications regarding data collected from an AF, either directly from the AF or via NEF.

The data collected from an AF is used as input for analytics by the NWDAF.

The details for the data collected from an AF as well as interactions between NEF, AF and NWDAF are described.

Hereinafter, the service operation described in the present invention will be described in detail.

<NEF Services>

*Nnef_EventExposure service (1) Nnef_EventExposure_Subscribe operation

Service operation name: Nnef_EventExposure_Subscribe

Description: the service consumer NF subscribes to receive an event, or if the event is already defined in NEF, then the subscription is updated.

Inputs (required): (Set of) Event ID(s) or Npcf_PolicyAuthorization_Notify and Naf_EventExposure_Subscribe service operation, Target of Event Reporting (GPSI or External Group Identifier), Event Reporting Information, Notification Target Address (+ Notification Correlation ID).

Inputs (optional): Event Filter, Subscription Correlation ID (in case of modification of the event subscription), Expiry time.

Outputs (required): When the subscription is accepted: Subscription Correlation ID, Expiry time (required if the subscription may be expired based on the operator's policy).

Outputs (optional): First corresponding event report is included, if available.

(2) Nnef_EventExposure_Unsubscribe service operation

Service operation name: Nnef_EventExposure_Unsubscribe

Description: the Service consumer NF deletes an event if already defined in NEF.

Inputs (required): Subscription Correlation ID.

Outputs (required): Operation execution result indication.

(3) Nnef_EventExposure_Notify service operation

Service operation name: Nnef_EventExposure_Notify

Description: NEF reports the event to the service consumer NF that has previously subscribed.

Inputs (required): Event ID, Notification Correlation Information, time stamp.

Inputs (optional): Event information (defined on a per Event ID basis).

Outputs (required): Operation execution result indication.

<AF Services>

*Naf_EventExposure service

Service description: This service enables service consumer NF to subscribe and get notified of events.

The events may be subscribed by a Service consumer NF are described.

The following service operations are defined for the Naf_EventExposure service:

Naf_EventExposure_Subscribe.

Naf_EventExposure_Unsubscribe.

Naf_EventExposure_Notify.

(1) Naf_EventExposure_Subscribe service operation

Service operation name: Naf_EventExposure_Subscribe

Description: The service consumer NF subscribes the event to collect AF data for UE(s), group of UEs, or any UE, or updates the subscription which is already defined in AF.

Input, Required: Target of Event Reporting: external UE ID(s), External Group Identifier, or indication that any UE is targeted, (set of) Event ID(s), Notification Target Address (+ Notification Correlation ID) and Event Reporting Information, Expiry time.

Input, Optional: NF ID, Event Filter(s) associated with each Event ID, Application ID, Subscription Correlation ID (in case of modification of the existing subscription).

NOTE: In the case of untrusted AF, NEF ID is used as NF ID.

Output, Required: Operation execution result indication. When the subscription is accepted: Subscription Correlation ID.

Output, Optional: First corresponding event report is included, if corresponding information is available.

(2) Naf_EventExposure_Unsubscribe service operation

Service operation name: Naf_EventExposure_Unsubscribe

Description: The service consumer NF unsubscribes for a specific event.

Input, Required: Subscription Correlation ID.

Input, Optional: None.

Output, Required: Operation execution result indication.

Output, Optional: None.

(3) Naf_EventExposure_Notify service operation

Service operation name: Naf_EventExposure_Notify

Description: The AF provides the previously subscribed event information to the service consumer NF which has subscribed to that event before.

Input, Required: Notification Correlation Information, Event ID, corresponding UE(s) (external UE ID(s), External Group Identifier, or indication of any UE), time stamp.

Input, Optional: Event specific parameter list.

Output, Required: None.

Output, Optional: None.

<Namf_EventExposure Service>

*Namf_EventExposure_Subscribe service operation

Service operation name: Namf_EventExposure_Subscribe.

Description: The service consumer NF uses this service operation to subscribe to or modify event reporting for one UE, a group of UE(s) or any UE.

Input, Required: NF ID, Target of Event Reporting: UE(s) ID (SUPI or Internal Group Identifier or indication that any UE is targeted), ((set of) Event ID(s), Notification Target Address (+ Notification Correlation ID))s, Event Reporting Information.

Input, Optional: (Event Filter (s) associated with each Event ID; Event Filter (s), Subscription Correlation ID (in the case of modification of the event subscription), Expiry time.

Output, Required: When the subscription is accepted: Subscription Correlation ID (required for management of this subscription), Expiry time (required if the subscription may be expired based on the operator's policy).

Output, Optional: First corresponding event report is included, if available.

The Service consumer NF subscribes to the event notification by invoking Namf_EventExposure to the AMF. The AMF allocates an Subscription Correlation ID for the subscription and responds to the service consumer NF with the Subscription Correlation ID. UE ID identifies the UE, SUPI and/or GPSI. Event ID identifies the events that the Service consumer NF is interested in. The Subscription Correlation ID is unique within the AMF Set.

The ((set of) Event ID(s), Notification Target Address (+ Notification Correlation ID)) helps the Event Receiving NF to co-relate a notification against a corresponding event subscription for the indicated Event ID.

In the case that the Service consumer NF subscribes to the AMF on behalf of other NF, the Service consumer NF include the Notification Target Address(+ Notification Correlation ID) of other NF for the Event ID which is to be notified to other NF directly, and the Notification Target Address(+ Notification Correlation ID) of itself for the Subscription Correlation ID change event. Each Notification Target Address(+ Notification Correlation ID) is associated with the related (set of) Event ID(s). When the Subscription Correlation ID change due to the AMF reallocation, the notification is sent to Service consumer NF which triggers this subscription.

Event filter may include "AN type(s)" as part of the list of parameter values to match, and it indicates to subscribe the event per Access Type. Event receiving NF ID identifies the NF that may receive the event reporting. When the service consumer NF needs to modify an existing subscription previously created by itself in the AMF, the service consumer NF invokes Namf_EventExposure_Subscribe service operation which contains the Subscription Correlation ID and the new Event Filters with Event ID to the AMF.

<Nudm_EventExposure_Subscribe Service Operation>

Service operation name: Nudm_EventExposure_Subscribe

Description: The Service consumer NF subscribes to receive an event, or if the subscription is already defined in UDM, then the subscription is updated.

Service consumer NFs: NEF.

Inputs (required): Target of Event Reporting: UE(s) ID (SUPI or GPSI, Internal Group Identifier or External Group Identifier, or indication that any UE is targeted), Event filter containing the Event Id(s) and Event Reporting Information.

Inputs (optional): Expiry time.

Outputs (required): Operation execution result indication. When the subscription is accepted: Subscription Correlation ID, Expiry time (required if the subscription may be expired based on the operator's policy).

Outputs (optional): First corresponding event report is included, if corresponding information is available, Number of UE if the External Group Identifier and Maximum Number of Reports are included in the inputs.

Number of UEs indicates the number of UEs within the group identified by the External Group Identifier. The NEF uses this value to determine whether the monitoring event has been reported for all group member UEs.

<Npcf_EventExposure_Subscribe Service Operation>

Service operation name: Npcf_EventExposure_Subscribe.

Description: The service consumer NF uses this service operation to subscribe to or modify event reporting for a group of UE(s) or any UE accessing a combination of (DNN, S-NSSAI).

Service consumer NFs: NEF.

Inputs (required): NF ID, Target of Event Reporting (Internal Group Identifier or indication that any UE accessing a combination of (DNN, S-NSSAI) is targeted, (set of) Event ID(s), Notification Target Address (+ Notification Correlation ID) and Event Reporting Information.

Inputs (optional): Event Filter (s) associated with each Event ID.

Outputs (required): Operation execution result indication. When the subscription is accepted: Subscription Correlation ID.

Outputs (optional): First corresponding event report is included, if corresponding information is available.

The Service consumer NF subscribes to the event notification by invoking Npcf_EventExposure to the PCF. The PCF allocates a Subscription Correlation ID for the subscription and responds to the service consumer NF with the Subscription Correlation ID. Event receiving NF ID identifies the NF that may receive the event reporting.

<Nsmf_EventExposure_Subscribe Service Operation>

Service operation name: Nsmf_EventExposure_Subscribe.

Description: This service operation is used by an NF to subscribe or modify a subscription for event notifications on a specified PDU Session or for all PDU Sessions of one UE, group of UE(s) or any UE.

Input, Required: NF ID, Target of Event Reporting, (set of) Event ID(s), Notification Target Address (+ Notification Correlation ID), Event Reporting Information.

Input, Optional: Event Filter(s) associated with each Event ID; Event Filter(s) are defined, Subscription Correlation ID (in case of modification of the event subscription), Expiry time.

Output, Required: When the subscription is accepted: Subscription Correlation ID (required for management of this subscription), Expiry time (required if the subscription may be expired based on the operator's policy).

Output, Optional: First corresponding event report is included, if available.

Notification Target Address (+ Notification Correlation ID) is used to correlate Notifications sent by SMF with this subscription.

<Procedures for Data Collection>

The Data Collection feature permits NWDAF to retrieve data from various sources (e.g. NF such as AMF, SMF, PCF, AF), as a basis of the computation of network analytics.

All available data encompass:

OAM global NF data, behaviour data related to individual UEs or UE groups (e.g. UE reachability), and pre-computed metrics covering UE populations (e.g. number of UEs present in a geographical area), per spatial and temporal dimensions (e.g. per region for a period of time), NF data available in the 5GC (e.g. NRF), Data available in AF.

The NWDAF may use at least one of the following services:

the Generic management services offered by OAM in order to collect OAM global NF data.

the Exposure services offered by NFs in order to retrieve NF data and other non-OAM pre-computed metrics.

Other NF services in order to collect NF data (e.g. NRF)

The NWDAF may obtain the proper information to perform data collection for a UE or group of UEs:

For an Analytics ID, NWDAF is configured with the corresponding NF Type(s) and/or event ID(s) and/or OAM measurement types.

NWDAF may determine which NF instance(s) of the relevant NF type(s) are serving the UE or group of UEs, optionally taking into account the S-NSSAI(s) and area of interest.

NWDAF invokes Nnf_EventSubscribe services to collect data from the determined NF instance(s), and/or triggers the procedure to subscribe to OAM services to collect the OAM measurement.

The NWDAF performs data collection from an AF directly as defined or via NEF as defined. The NWDAF may be able to discover the metrics supported by a NF. Data collection procedures enables the NWDAF to efficiently obtain the appropriate data with the appropriate granularity. When a request or subscription for statistics or predictions is received, the NWDAF may not possess the necessary data to perform the service.

Data on the monitoring period in the past matching the Analytics target period is necessary for the provision of statistics and predictions.

Data on longer monitoring periods in the past is necessary for model training.

Therefore, in order to optimize the service quality, the NWDAF may undertake the following actions:

The NWDAF may return a probability assertion expressing the confidence in the analytics produced. With zero confidence, no analytics may be returned. This confidence is likely to grow in the case of subscriptions.

The value of the confidence depends on the level or urgency expressed by the parameter "time when analytics information is needed" as listed, the parameter "preferred level of accuracy of the analytics" as listed, the availability of data. If no sufficient data is collected to provide an estimation for the requested level of accuracy before the time deadline, the service may return a zero confidence. Otherwise, the NWDAF may wait until enough data is collected before providing a response or a first notification.

In order to be prepared for future requests on statistics from NFs/OAM, the NWDAF, upon operator configuration, may collect data on its own initiative, e.g. on samples of UEs (e.g. mobility), and retain the data collected in the data storage.

The volume and maximum duration of data storage is also subject of operator configuration. The NWDAF may decide to reduce the amount of data collection in case of high signalling load, by either prioritizing requests, reducing the duration of data collection, or the sampling ratios. The NWDAF may skip data collection phase when the NWDAF already has enough information to provide requested analytics.

The data which NWDAF may collect is listed for each analytics in input data clause. NWDAF may skip data collection phase for some specific input data per the requested analytics e.g. when some of the data is already available at NWDAF for the requested analytics, or when NWDAF considers that some of the data is not needed at all to provide the requested analytics as per the analytics consumer request (e.g. based on preferred level of accuracy or based on the time when analytics are needed).

<Data Collection from NFs>

The Data Collection from NFs is used by NWDAF to subscribe/unsubscribe at any NF to be notified for data on a set of events. The Data Collection from NFs is based on the services of AMF, SMF, UDM, PCF, NRF and AF (possibly via NEF):

Event Exposure Service offered by each NF.

other NF services (e.g. Nnrf_NFDiscovery and Nnrf_NF-Management in NRF)

This data collection service is used directly in order to retrieve behaviour data for individual UEs or groups of UEs (e.g. UE reachability), and also to retrieve global UE information (e.g. Number of UEs present in a geographical area).

To retrieve data related to a specific UE, the NWDAF may first determine which NF instances are serving this UE unless the NWDAF has already obtained this information due to recent operations related to this UE.

Table 2 shows the services consumed by the NWDAF device for data collection.

TABLE 2

| Service producer | Service |
| --- | --- |
| AMF | Namf_EventExposure |
| SMF | Nsmf_EventExposure |
| PCF | Npcf_EventExposure |
| UDM | Nudm_EventExposure |
| NEF | Nnef_EventExposure |
| AF | Naf_EventExposure |
| NRF | Nnrf_NFDiscovery |
|  | Nnrf_NFManagement |

Table 3 shows NF services consumed by an NWDAF device that determines whether to provide an NF instance to a user terminal.

TABLE 3

| NF instance (serving the UE) to determine | NF to be contacted by NWDAF | Service |
| --- | --- | --- |
| UDM | NRF | Nnrf_NFDiscovery |
| AMF | UDM | Nudm_UECM |
| SMF | UDM | Nudm_UECM |
| BSF | NRF | Nnrf_NFDiscovery |
| PCF | BSF | Nbsf_Management |
| NEF | FFS |  |
| AF | FFS |  |

The AMF, SMF instances should be determined using a request to UDM providing the SUPI. To determine the SMF serving a PDU session, the NWDAF should in addition provide the DNN and S-NSSAI of this PDU Session; otherwise the NWDAF will obtain a list of possibly multiple SMFs (e.g. one per PDU session). The BSF instance should be discovered using NRF thanks to optional request parameters (e.g. DNN list, IP domain list, IPv4 address range, IPv6 prefix range), or based on local configuration at the NWDAF. The PCF instance serving UE PDU Session(s) should be determined using a request to BSF with the SUPI. To determine the PCF serving a PDU session, the NWDAF should in addition provide the DNN and S-NSSAI of this PDU Session; otherwise the NWDAF will obtain a list of possibly multiple PCFs (e.g. one per PDU session).

Figure 2:
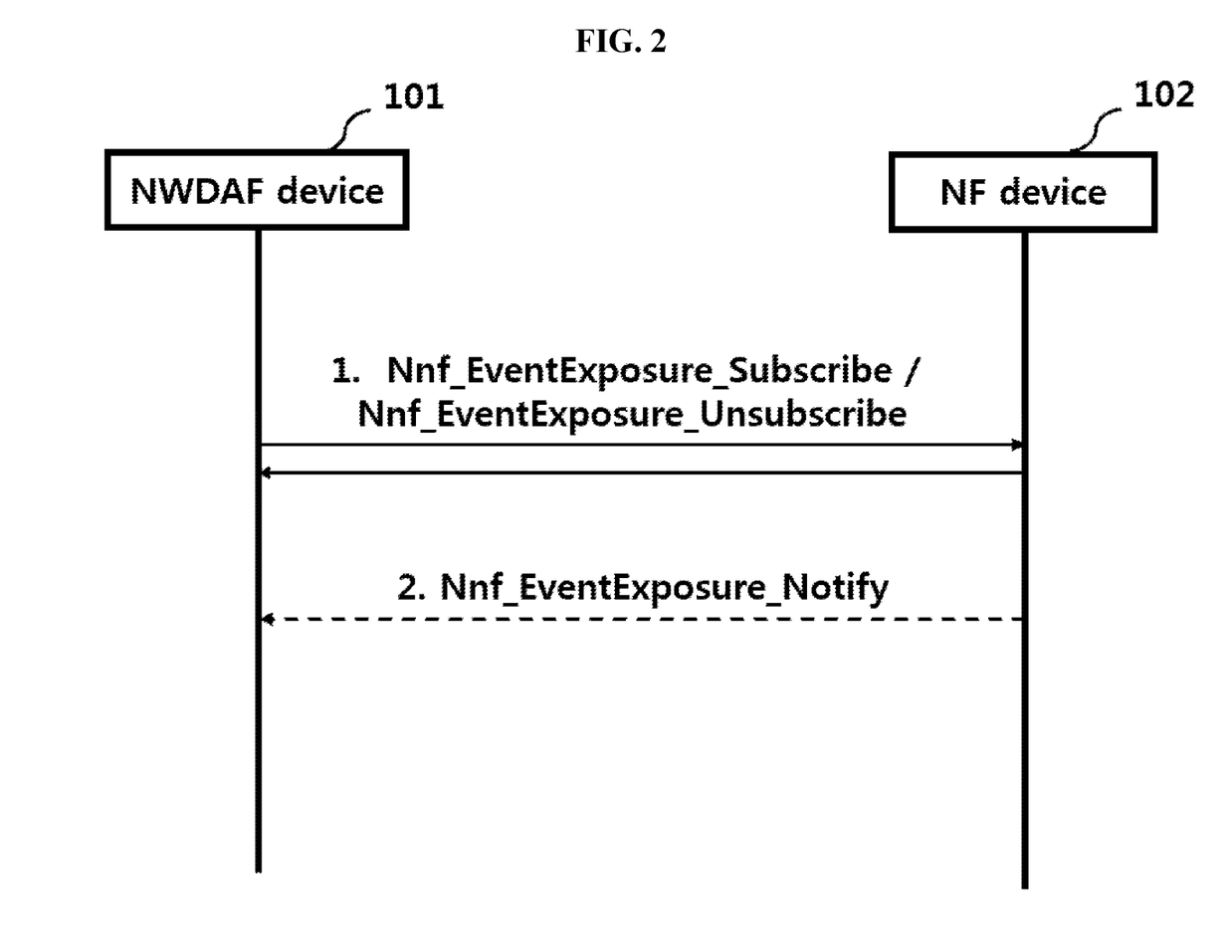
FIG. 2 is a diagram illustrating a procedure for collecting data from NF device according to an example embodiment.

FIG. 2 is a diagram illustrating a procedure for collecting data from NF device according to an example embodiment.

The procedure is used by NWDAF to subscribe/unsubscribe at NFs in order to be notified for data collection on a related event (s), using Event Exposure Services 1. The NWDAF subscribes to or maycels subscription for a (set of) Event ID(s) by invoking the Nnf_EventExposure_Subscribe/Nnf_EventExposure_Unsubscribe service operation.

2. If NWDAF subscribes to a (set of) Event ID(s), the NFs notify the NWDAF (e.g. with the event report) by invoking Nnf_EventExposure_Notify service operation.

The NWDAF may use the immediate reporting flag to meet the request-response model for data collection from NFs.

Figure 3:
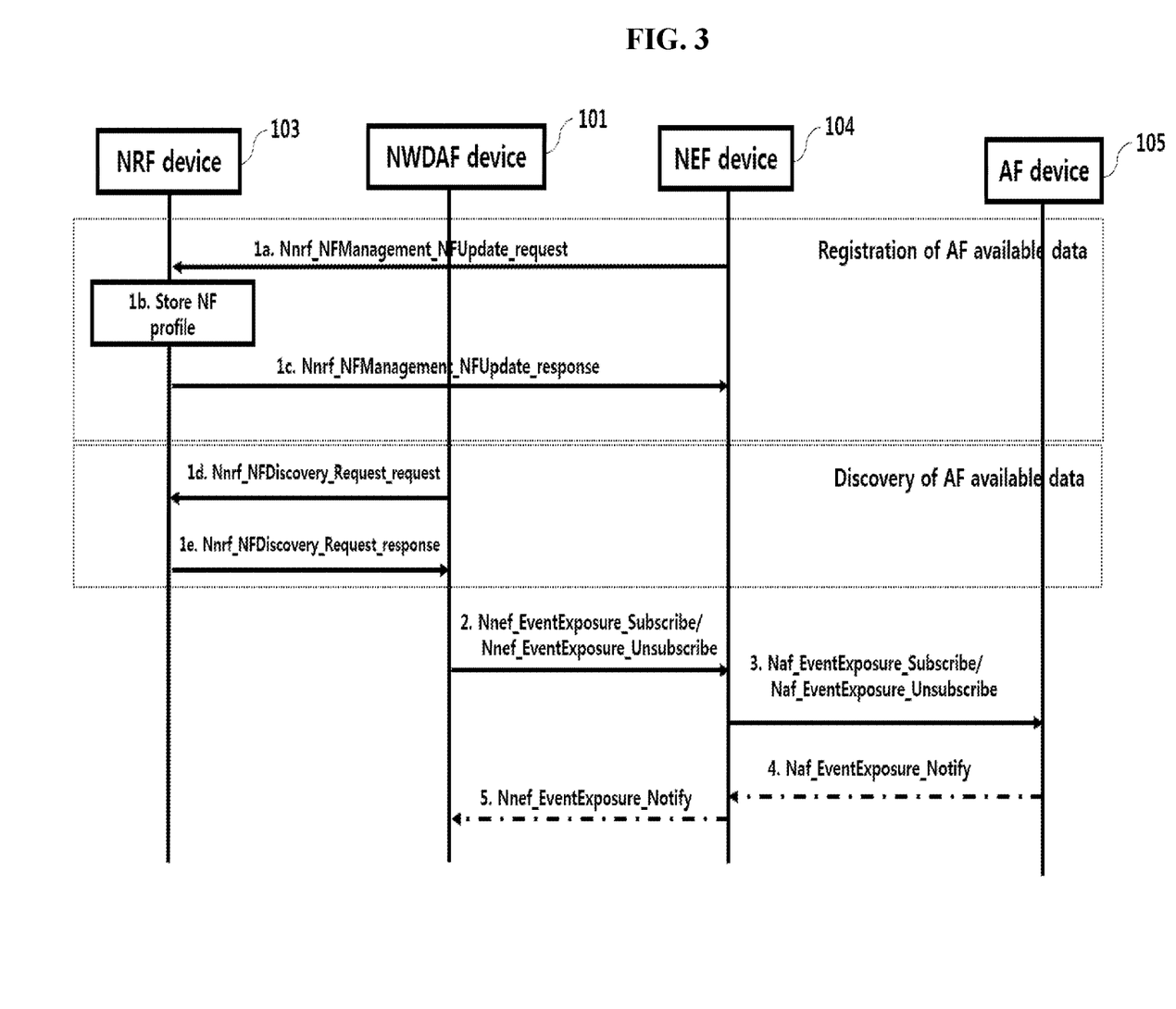
FIG. 3 is a flowchart illustrating a procedure for collecting data from AF device via NEF device according to an example embodiment.

FIG. 3 is a flowchart illustrating a procedure for collecting data from AF device via NEF device according to an example embodiment.

The procedure is used by NWDAF to collect information from AFs via the NEF. In this release, AF registers its available data to NWDAF via OAM configuration at NEF. The AF collectable data information includes: AF identification, AF service identification (e.g., endpoint information of Naf_EventExposure), available data to be collected per application (e.g., identified by Event ID(s)).

1a. After the registration of AF available data at the NEF, NEF generates an event exposure with new EventID to be associated with available data to be collected from AF. NEF invokes Nnrf_NFManagement_NFUpdate_request service operation to update its registration information (i.e., NEF Profile) including the generated Event IDs, and associated AF identification, Application ID(s).

1b. NRF stores the received NEF registration information including available data to be collected from AF.

1c. NRF sends Nnrf_NFManagement_NFUpdate_response message to NEF.

1d. When NWDAF needs to discovery the available data from AFs and the appropriated NEF to collect this data, NWDAF invokes Nnrf_NFDiscovery_Request_request service operation using as parameter including the NEF NF Type, a list of Event ID(s), and optionally AF identification, application ID.

1e. NRF matches the requested query for available data in AFs with the registered NEF Profiles and sends this information via Nnrf_NFDiscovery_Request_response message to NWDAF. After the registration and discovery procedure, NWDAF identifies the available data per AF per application and the proper NEF to collect such data.

2. The NWDAF subscribes to or maycels subscription to data in AF via NEF by invoking the Nnef_EventExposure_Subscribe or Nnef_EventExposure_Unsubscribe service operation. If the event subscription is authorized by the NEF, the NEF records the association of the event trigger and the NWDAF identity.

3. Based on the request from the NWDAF, the NEF subscribes to or maycels subscription to data in AF by invoking the Naf_EventExposure_Subscribe/Naf_EventExposure_Unsubscribeserviceoperation.

4. If the NEF subscribes to data in AF, the AF notifies the NEF with the data by invoking Naf_EventExposure_Notify service operation.

5. If the NEF receives the notification from the AF, the NEF notifies the NWDAF with the data by invoking Nnef_EventExposure_Notify service operation. The NWDAF may use NRF services and Network Function service framework procedures:

<Data Collection from the NRF>

NF/NF service discovery procedures and Nnrf_NFDiscovery is used in order to dynamically discover the NF instances and services of the 5GC. Such discovery may be performed on a periodic basis, or under specific circumstances.

NF/NF service status subscribe/notify procedures and Nnrf_NFManagement service is used in order to be notified about the change of status of an NE. The service operations for obtaining status information are NFStatusSubscribe and NFStatusNotify, from the Nnrf_NFManagement service.

The information provided by the NRF to the NWDAF with the NnrfNFDiscovery_Request and the Nnrf_NFManagement_NFStatusNotify operations are the NFProfile and the NFService. Such information may be used to set-up and maintain a consistent network map for data collection and also, depending on use cases, in order to perform estimations:

NF profile: NF capacity, NF load information, NF status, NF recovery time, NF locality;

NF service: service capacity, service load information, service status, service recovery time.

NF Profile: NF capacity, NF load information, NF status, NF recovery time, NF locality NF service: service capacity, service load information, service status, service recovery time <Usage of Exposure Framework by the NWDAF for Data Collection>

The NWDAF may subscribe (and unsubscribe) to the Event exposure service from NF(s) reusing the framework. This framework supports the possibility for the NWDAF to indicate/request:

Events-ID: one or multiple Event ID(s)

Target of Event Reporting: the objects targeted by the Events. Within a subscription, all Event ID(s) are associated with the same target of event reporting. In the case of NWDAF, the objects may be UE(s), UE group(s), any UE.

Event Filter Information. This provides Event Parameter Types and Event Parameter Value(s) to be matched against.

A Notification Target Address and a Notification Correlation ID, allowing the NWDAF to correlate notifications received from the NF with this subscription.

Event Reporting Information.

Expiry time.

The notifications from NFs/AFs contain on top of the Event being reported (and of dedicated information being reported for this event):

the Notification Correlation Information provided by the NWDAF in its request, (when applicable to the event) the Target Id e.g. UE ID (SUPI and if available GPSI), and a time stamp.

Figure 4:
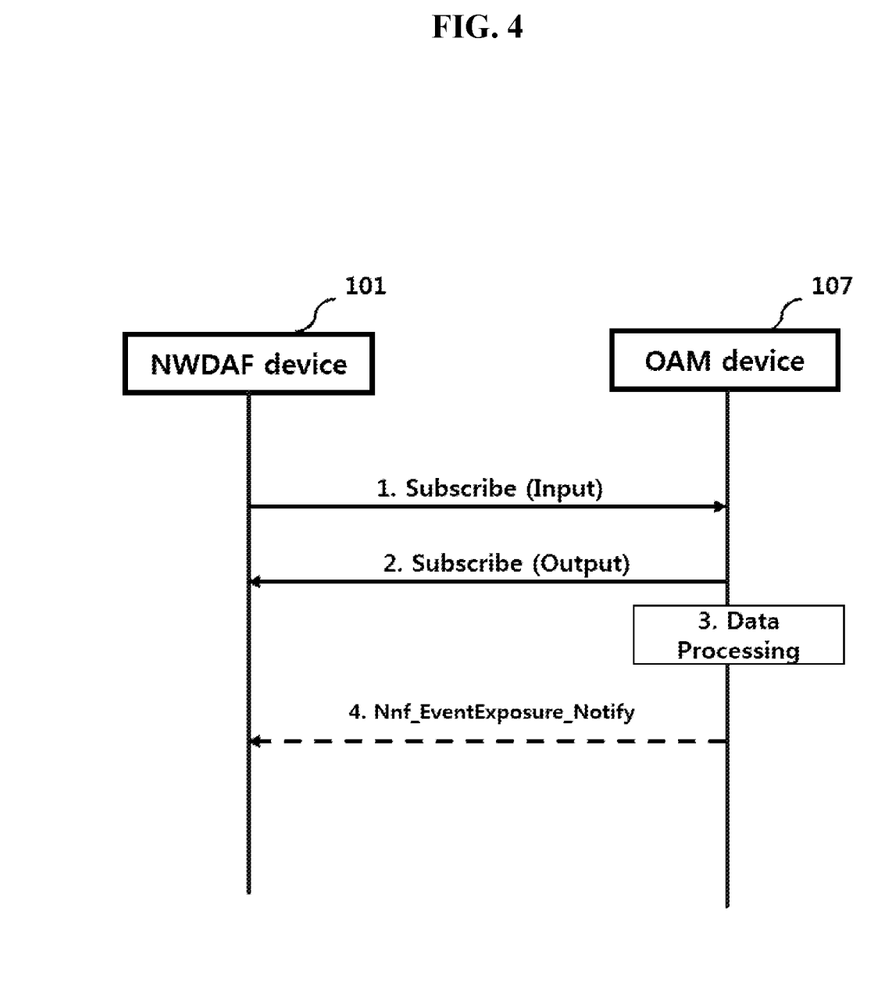
FIG. 4 is a flowchart illustrating a procedure for collecting data from OAM device according to an example embodiment.

FIG. 4 is a flowchart illustrating a procedure for collecting data from OAM device according to an example embodiment.

The NWDAF may collect relevant management data from the services in the OAM as configured by the PLMN operator.

NG RAN or 5GC performance measurements.

5G End to end KPIs.

NG RAN 또는 5GC performance measurements

5G End to end KPIs

NWDAF may use the following services to have access to the information provided by OAM:

Generic performance assurance and fault supervision management services.

PM (Performance Management) services.

FS (Fault Supervision) services.

OAM perform the required configuration in order to provide the information requested by NWDAF subscription and perform the tasks, e.g. data collection, data processing, associated with the subscribed request from NWDAF.

The interactions between NWDAF and OAM for data collection are illustrated. The data collected depends on the use cases. The flow below assumes the NWDAF is configured on how to subscribe to the relevant OAM services. OAM may setup the required mechanisms to guarantee the continuous data collection requested by NWDAF.

1. Subscribe (Input): NWDAF subscribes to the notification(s) related to the services provided by the management service producer.

2. Subscribe (Output): management service producer responses to NWDAF if the subscription is success or not.

3. Data processing: management service producer prepares the data.

4. Notification (notifyFileReady): management service producer notifies the data file is ready. As the final step, NWDAF fetches data by using FTP.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network data collecting method performed by a network data analytic function (NWDAF) device, comprising:
   transmitting a first message for a subscription of an event to a network function (NF) device, the first message including a first reporting period;
   receiving a response message including a subscription ID corresponding to the subscription from the NF device;
   transmitting a second message for update of the subscription to the NF device, the second message including the subscription ID and a second reporting period different from the first reporting period; and
   receiving a notification message for the update of the subscription from the NF device.

2. The method of claim 1, wherein the first message further includes a first expiry time and the second message further includes a second expiry time different from the first expiry time.

3. The method of claim 1, wherein an event ID of the event identifies a type of the event being subscribed to a Protocol Data Unit (PDU) session release or mobility information of a user equipment out of an area of interest.

4. The method of claim 1, wherein the first message further includes at least one of:
   (i) an event ID;
   (ii) a target of event reporting which is object targeted by the event;
   (iii) event filter information which provides an event parameter type and an event parameter value;
   (iv) a notification target address which allows the NWDAF device to correlate notification received from the NF device;
   (v) event reporting information;
   (vi) notification correlation information provided by the NWDAF device; and
   (vii) a time stamp.

5. The method of claim 4, wherein the event reporting information includes a parameter related to at least one of (i) an event reporting mode, (ii) a maximum number of reports, (iii) a maximum duration of reporting, (iv) an immediate reporting flag, (v) a sampling ratio and (vi) a group reporting guard time.

6. The method of claim 1, wherein the event is to be modified by adding or removing an event ID of the event, or by changing event filter information.

7. The method of claim 1, wherein the NWDAF device collects data including (i) behavior data related to a user equipment (UE) or UE groups and (ii) pre-computed metrics covering UE populations per spatial dimensions and temporal dimensions, from the NF device.

8. The method of claim 1, wherein a single instance is or multiple instances of the NWDAF device are deployed in a PLMN (Public Land Mobile Network).

9. A network data analytic function (NWDAF) device, the NWDAF device comprising:
   a processor configured to:
   transmit a first message for a subscription of an event to a network function (NF) device, the first message including a first reporting period;
   receive a response message including a subscription ID corresponding to the subscription from the NF device;
   transmit a second message for update of the subscription to the NF device, the second message including the subscription ID and second reporting period different from the first reporting period; and
   receive a notification message for the update of the subscription from the NF device.

10. The NWDAF device of claim 9, wherein the first message further includes a first expiry time and the second message further includes a second expiry time different from the first expiry time.

11. The NWDAF device of claim 9, wherein an event ID of the event identifies a type of the event being subscribed to a Protocol Data Unit (PDU) session release or mobility information of a user equipment out of an area of interest.

12. The NWDAF device of claim 9, wherein the first message further includes at least one of:
   (i) an event ID;
   (ii) a target of event reporting which is object targeted by an event;
   (iii) event filter information which provides an event parameter type and an event parameter value;
   (iv) a notification target address and a notification correlation ID which allows the NWDAF device to correlate notification received from the NF device;
   (v) event reporting information;
   (vi) notification correlation information provided by the NWDAF device; and
   (vii) a time stamp.

13. The NWDAF device of claim 12, wherein the event reporting information includes a parameter related to at least one of (i) an event reporting mode, (ii) a maximum number of reports, (iii) a maximum duration of reporting, (iv) an immediate reporting flag, (v) a sampling ratio and (vi) a group reporting guard time.

14. The NWDAF device of claim 9, wherein the event is to be modified by adding or removing an event ID of the event, or by changing event filter information.

15. The NWDAF device of claim 9, wherein the NWDAF device collects data including (i) behavior data related to a user equipment (UE) or UE groups and (ii) pre-computed metrics covering UE populations per spatial dimensions and temporal dimensions, from the NF device.

16. The NWDAF device of claim 9, wherein a single instance is or multiple instances of NWDAF device are deployed in a PLMN (Public Land Mobile Network).

* * * * *